United States Patent
Moodycliffe et al.

(10) Patent No.: US 6,930,080 B2
(45) Date of Patent: Aug. 16, 2005

(54) WIPES IMPREGNATED WITH BILIQUID FOAM TREATING LIQUIDS

(75) Inventors: Timothy I. Moodycliffe, Milwaukee, WI (US); Ralph W. Oakeson, Racine, WI (US); Lynn M. Werkowski, Oak Creek, WI (US)

(73) Assignee: S. C. Johnson & Son, Inc., Racine, WI (US)

( * ) Notice: Subject to any disclaimer, the term of this patent is extended or adjusted under 35 U.S.C. 154(b) by 365 days.

(21) Appl. No.: 10/291,284

(22) Filed: Nov. 8, 2002

(65) Prior Publication Data

US 2004/0092417 A1 May 13, 2004

(51) Int. Cl.$^7$ ............................. C11D 3/37; C11D 9/36
(52) U.S. Cl. ................. 510/295; 510/466; 510/268; 510/271; 510/251
(58) Field of Search ................. 510/295, 466, 510/268, 271, 251

(56) References Cited

U.S. PATENT DOCUMENTS

| | | | | |
|---|---|---|---|---|
| 3,200,036 A | * | 8/1965 | Greeublatt | ............... 15/104.93 |
| 3,965,518 A | * | 6/1976 | Muoio | ..................... 15/104.93 |
| 3,965,519 A | * | 6/1976 | Hermann | ................. 15/104.93 |
| 4,486,333 A | | 12/1984 | Sebba | |
| 4,725,489 A | | 2/1988 | Jones et al. | |
| 4,753,844 A | | 6/1988 | Jones et al. | |
| 4,963,432 A | | 10/1990 | Fuggini et al. | |
| 5,648,083 A | * | 7/1997 | Blieszner et al. | ........... 424/402 |
| 5,681,377 A | * | 10/1997 | Lohr et al. | ..................... 106/3 |
| 5,914,177 A | | 6/1999 | Smith, III et al. | |
| 6,121,165 A | | 9/2000 | Mackey et al. | |
| 6,136,775 A | | 10/2000 | Strout et al. | |
| 6,165,479 A | | 12/2000 | Wheeler | |
| 6,270,878 B1 | | 8/2001 | Wegele et al. | |
| 6,312,760 B1 | | 11/2001 | Wheeler | |
| 6,361,784 B1 | * | 3/2002 | Brennan et al. | ............ 424/402 |

FOREIGN PATENT DOCUMENTS

| | | | | |
|---|---|---|---|---|
| GB | 1020672 | 2/1966 | ............ A47I/13/28 |
| WO | WO98/26040 | 6/1998 | ........... C11D/17/04 |
| WO | WO99/06523 | 2/1999 | ........... C11D/17/04 |

OTHER PUBLICATIONS

F. Sebba, Biliquid Foams–A Prellminary Report, 40 J. Colloid. Interface Sci 468–474 (1972).
O. Sonneville–Aubrun et al., Surfactant Films In Biliquid Foams, 16 Langmuir 1566–1579 (2000).
A Disperse Technologies Limited 1998 technical presentation entitled "Advanced Topical Dispersion Technology".

* cited by examiner

Primary Examiner—Charles Boyer

(57) ABSTRACT

A disposable wipe impregnated with furniture polish or another surface treating liquid such as a hard surface cleaner or insect repellant is disclosed. The liquid is in the form of a dispersion which is a biliquid foam with a thickener, where the foam is structured as an oil-in-water complex. The dispersion has an oil portion having a polysiloxane and/or a hydrocarbon oil. There is also surfactant such as one non-ionic surfactant and one polar surfactant. Water is also provided. The biliquid structure stabilizes the dispersion even with very low levels of surfactant, while the thickener retards migration of the impregnated liquid in response to gravity.

10 Claims, No Drawings

US 6,930,080 B2

WIPES IMPREGNATED WITH BILIQUID FOAM TREATING LIQUIDS

CROSS REFERENCE TO RELATED APPLICATIONS

Not applicable.

STATEMENT REGARDING FEDERALLY SPONSORED RESEARCH AND DEVELOPMENT

Not applicable

BACKGROUND OF THE INVENTION

This invention relates to wipes that have been impregnated with biliquid foam surface treating liquids, such as a furniture polish or cleaner. In particular, it relates to such wipes where the liquid is stable and resistant to migration through a wipe in response to gravity.

Wipes have been previously been impregnated with a wide variety of cleaning, polishing, and other treating liquids. See e.g. U.S. Pat. Nos. 4,725,489, 4,753,844, 4,963,432, 5,914,177, 6,121,165, 6,136,775 and 6,270,878. Pre-impregnated wipes are particularly advantageous because they simultaneously apply the desired liquid to the surface to be treated, spread the material along the surface, and remove undesired materials. In the case of a furniture polish wipe, the wipe can also act as a buffer.

For example, in U.S. Pat. No. 3,965,518 it was proposed to impregnate cellulosic wipes with a furniture polish containing, among other things, water, mineral oil, silicon oil, nonionic surfactant and/or anionic surfactant, preservative and pH adjustor, in an emulsion form. However, emulsions have a tendency to migrate with gravity when such wipes are stacked in a container for storage. Thus, wipes at the top of the stack tended to have less impregnating polish.

Moreover, some emulsions tend to interfere with the effectiveness of some antimicrobial agents. This can be a particular problem with respect to wipes designed to have an antibacterial effect on the surfaces that they treat.

Further, some emulsions are not stable long term absent use of high levels of surfactant. High levels of surfactant may cause residue problems, particularly in the field of furniture polishes.

Particularly desirable ingredients in furniture polishes are silicone oils. However, conventional emulsions tend to have stability problems when they contain silicone oils absent the use of a hydrocarbon solvent. Such hydrocarbon solvents can be undesirable due to environmental or flammability concerns.

In unrelated work the art has developed oil-in-water dispersions known as biliquid foams. In these dispersions the oil is present in discrete droplets surrounded by a first surfactant. The remaining water has dissolved in it a second surfactant. The second surfactant migrates to the surfactant-coated surface of the oil to create at least some drops (preferably most oil drops) surrounded by a bilayer of surfactant. See generally U.S. Pat. Nos. 4,486,333 and 6,312,760. See also F. Sebba, Biliquid Foams-A Preliminary Report, 40 J. Colloid. Interface Sci. 468–474 (1972); O. Sonneville-Aubrun et al., Surfactant Films In Biliquid Foams, 16 Langmuir 1566–1579 (2000) and a Disperse Technologies Limited 1998 technical presentation entitled "Advanced Topical Dispersion Technology".

Early versions of these foams suffered from significant instability. However, U.S. Pat. No. 6,165,479 teaches that by adding a viscosity modifier/thickener to such foams can markedly increase the stability of the foam. However, this patent was largely focused on formulating cosmetics, and did not address design problems in creating formulations for wipes.

Thus, a need still exists for improved impregnated wipes, particularly those that resist the tendency of gravity to cause the impregnating liquid to migrate to the bottom of the stack.

SUMMARY OF THE INVENTION

In one form the invention provides a disposable wipe for treating a selected surface (e.g. furniture such as with a furniture polish, flooring such as with a floor polish, other hard surface such as with a hard surface cleaner, skin such as with an insect control repellant, etc.). The wipe has a fabric that has been impregnated with a liquid in the form of a dispersion. The dispersion includes a biliquid foam (preferably oil-in-water) and a thickener selected from the group consisting of carbomers, colloidal polymers and gums. Most preferably, the dispersion, apart from the thickener, has at least 0.01% by weight of an oil selected from the group consisting of polysiloxanes and hydrocarbon oils, between 0.0001% and 2% by weight of surfactant, and at least 10% by weight of water.

The dispersion, apart from the thickener, will typically have between 0.0001% and 2% by weight of an essentially non-polar surfactant (e.g. a nonionic surfactant), and between 0.0001% and 2% by weight of a more polar surfactant selected from the group consisting of anionic surfactants, cationic surfactants and amphoteric surfactants.

In the context of a furniture polishing wipe the dispersion, apart from the thickener, preferably has at least 0.25% by weight of polysiloxane. For other applications different amounts of polysiloxane and/or hydrocarbon oil may be used.

The dispersion resists migration along the wipe downward in response to gravity. This makes a stack of such wipes (as stored in a conventional dispensing box) likely to have a more uniform concentration of dispersion from wipe to wipe, as the wipes are used by the consumer over time.

In another aspect the invention provides a method of polishing a piece of furniture. One obtains such a wipe and rubs it on the furniture surface so as to transfer some of the impregnated liquid from the wipe to the furniture. The wipe then spreads the transferred liquid along the surface of the furniture.

The wipe fabric can be made of a pulp-based material. However, the fabric may contain mixtures of cellulosic fibers with other natural or synthetic fibers (e.g. cotton or wool), or be entirely formed of other natural or synthetic fibers (e.g. rayon, polyamide fibers, acrylonitrile fibers, polyester fibers, vinyl fibers, protein fibers, fluorocarbon fibers, dinitrile fibers, etc.).

The dispersion should include a thickener/viscosity modifier, typically at 0.05% or over of the overall weight of the dispersion. Suitable thickeners include carbomers (such as a polymer of acrylic acid that has been cross-linked with a polyfunctional agent), colloidal polymers, or gums at a concentration of between 0.05 and 20% (preferably no more than 2% by weight) of the dispersion.

Other examples are alginate gums or their salts, guar gum, locust bean gum, xanthane gum, gum acacia, gelatin, hydroxymethylcellulose, hydroxyethylcellulose, hydroxypropylcellulose, carboxymethylcellulose, salts of these compounds, bentonites, magnesium aluminum silicates, and glyceryl polymethacrylates and their dispersions in glycols, and mixtures thereof. The most preferred thickener for our furniture polishing wipes is a salt of a cross-linked polymer of acrylic acid known as Carbopol® Ultrez 5 (which is available from B.F. Goodrich). In particular, this thickener is a polymer of acrylic acid cross-linked with allylpentaerythritol.

The dispersion may also have other optional ingredients. For example, there may be a preservative such as Kathon® CG/ICP which is available from Rohm and Haas, appropriately pH adjusted with sodium hydroxide. There may also be scratch cover colorants, fragrances and other additives as are conventional in the furniture polishing field when the product is a furniture polish.

A wide variety of nonionic surfactants appear to be used for the purposes of the present invention. We particularly prefer the use of Laureth-4 (polyethylene glycol ether of lauryl alcohol). However, one could instead use an alkanolamide, an ester of a polyhydric alcohol (for example an ester of an ethylene, diethylene or propylene glycol, or glycerol or a polyglycerol, or sorbitan, glucose or sucrose), a polyoxyethylene or polyoxypropylene derivative of an alcohol, amide or ester, or a polyoxyethylene/polyoxypropylene block copolymer, or a suitable compatible mixture thereof.

The other surfactant (when, as is typical, two are used) can be selected from a wide variety of more polar surfactants. We prefer the anionic surfactant sodium lauryl ether sulphate. However, numerous other anionics should be suitable. Examples are acyl-lactate, N-acylsarcosinate, alkyl-carboxylate (either mono- or polyvalent), alkyl ether carboxylate, N-alkyl-glutamate, fatty acid-peptide condensate, phosphated ethoxylated alcohol, alkyl sulphate, ethoxylated alkyl sulphate, alpha-olefin sulphonate and ester-linked sulphonate.

The other surfactant may also be a cationic surfactant, an example of which is an amidoamine. Alternatively, the other surfactant might be an amphoteric such as acylaminoacid, an N-substituted alkylamine, an N-alkyl-β-aminopropionate, an N-alkylbetaine, an alkylimidazoline and a sulphobetaine.

The preferred polysiloxane is a dimethylpolysiloxane. However, other silicones can also be used. Further, a wide variety of hydrocarbon oils should be suitable.

It will be appreciated that the present invention provides wipes with a highly stable impregnating liquids. The liquids surprisingly have a greatly reduced tendency to migrate with gravity than would be the case for conventional otherwise similar liquids which are emulsion form and/or unthickened. Further, relatively small amounts of our thickener do not interfere with the surface treatment characteristics of the liquid (e.g. ease of rubbing; visible residue; etc.).

When the liquid is a hard surface cleaner additives conventional for those products (e.g. those that have previously been used in liquid emulsions) will be incorporated into these dispersions in similar concentrations (albeit with the surfactants correspondingly lower). Similarly, where the liquid is an insect control agent (e.g. insecticide, repellant, or insect growth regulator), the additives will be those conventional for those types of products (e.g. those that have previously been used in liquid emulsions), again incorporated with lower surfactant levels.

While preferred embodiments have been discussed above and will be discussed below, it should be appreciated that these are merely examples of the invention. For a more complete appreciation of the full scope of the invention the claims should be reviewed.

DETAILED DESCRIPTION OF THE PREFERRED EMBODIMENTS

We obtained a dry Vicel 6012 cellulosic fabric from Buckeye Technologies, which was about 21 cm long×33 cm wide×1 mm thick. We impregnated this fabric with a dispersion suitable as a furniture polish by spraying the fabric with the dispersion. Alternatively, the dispersion could be dropped, sprayed, or otherwise applied to the fabric to cause the impregnation.

After the impregnation process, the weight of the impregnated polishing liquid was in our preferred embodiment equal to about twice the pre-impregnation weight of the wipe. Of course, the wipe could be impregnated with more or less of the liquid, thereby rendering it more or less saturated.

A preferred furniture polish dispersion for use as the impregnating liquid has the following formula:

| Weight Percent | Common name (may be a commercial name) | Chemical Name |
| --- | --- | --- |
| to 100% | | water |
| .1% | Carbopol ® Ultrez 5 | carbomer |
| 5% | Klearol | white mineral oil |
| 2% | PDMS 100 cts | polydimethylsiloxane |
| 2% | PDMS 1000 cts | polydimethylsiloxane |
| .075% | | Laureth-4 |
| .01% | | sodium lauryl ether sulphate |
| .0255% | Kathon ® CG/ICP | methychloroisothiazolone |
| .265% | | sodium hydroxide |

Klearol mineral oil is available from Witco Corp. and consists of saturated aliphatic and alicyclic non-polar hydrocarbons. The polysiloxanes can be obtained from a variety of different sources, such as Wacker Silicones or Dow Corning. Laureth-4 is a widely available nonionic surfactant (also known as polyethylene glycol ether of lauryl alcohol).

In producing the dispersion, one preferably first mixes the three oil components with the nonionic surfactant (Laureth-4). One then separately mixes the water, thickener, anionic surfactant (sodium lauryl ether sulphate), Kathon® preservative and sodium hydroxide. At this point, one takes about 10 percent of the water phase and places it in a container. One then slowly drops the oil phase into the water phase while gently stirring at the top surface of the oil phase.

Once the oil phase has been entirely added to the container, one then adds the remaining portion of the water phase. This latter step can be done more quickly than the step of addition of the oil to the 10 percent of the water.

The reason for this particular preferred method of formation of the biliquid foam is to provide the oil with the ability to be completely surrounded by the water phase in a properly ordered manner. This helps greatly in the formation of the biliquid foam.

It should be appreciated that instead of a furniture polish, the impregnating liquid could be a cleaning fluid, a waxing solution for floors, or even a wet-wipe containing an insect repellant for human skin. In any event, what is important in the case of these wipes is that the biliquid foam be thickened.

As an example, a wipe suitable for cleaning a hard surface could be impregnated with a dispersion of the following formula:

| Weight Percent | Common name (may be a commercial name) | Chemical Name |
|---|---|---|
| to 100% | | water |
| .1% | Carbopol ® | carbomer |
| 5% | Klearol | white mineral oil |
| .05% | | Laureth-4 |
| .007% | | sodium lauryl ether sulphate |
| .051% | Kathon ® CG/ICP | methychloroisothiazolone |
| .531% | | sodium hydroxide |

It should be particularly noted that the resulting wipes do not need to have volatile solvents such as alcohols, even where polysiloxanes or other oils are included. This is highly advantageous.

While the preferred preservative is Kathon® CG/ICP, the formulation may also contain other antimicrobial agents such as an ester of p-hydroxybenzoic acid, formalin or imidazolidinylurea.

As another example, a wipe suitable for providing a consumer with insect repellant protection could be impregnated with a dispersion of the following formula:

| Weight Percent | Common name (may be a commercial name) | Chemical Name |
|---|---|---|
| to 100% | | water |
| .2% | Carbopol ® Ultrez 5 | carbomer |
| 1% | Klearol | mineral oil |
| 15% | DEET | insecticide |
| .18% | nonionic surfactant | Laureth-4 |
| .02% | anionic surfactant | sodium lauryl ether sulphate |
| .05% | Kathon ® CG/ICP | methychloroisothiazolone |
| .53% | | sodium hydroxide |

While the preferred embodiments have been described above, there are numerous other embodiments that are within the spirit and scope of the invention. Thus, the claims should be looked to in order to appreciate the full scope of the invention, and the claims are not to be construed to be limited to just the preferred embodiments.

Industrial Applicability

The invention provides improved impregnated wipes, and methods for their use, the wipes being capable of treating furniture and other surfaces.

We claim:

1. A disposable wipe for treating a selected surface, the wipe comprising:
 a fabric that has been impregnated with a liquid in the form of a dispersion, the dispersion comprising a biliquid foam having a thickener selected from the group consisting of carbomers, colloidal polymers and gums, the dispersion, apart from the thickener, comprising:
 at least 0.01% by weight of an oil selected from the group consisting of polysiloxanes and hydrocarbon oils;
 between 0.002% and 2% by weight of surfactant; and
 at least 10% by weight of water;
 wherein the dispersion, apart from the thickener, comprises between 0.001% and 1% by weight of nonionic surfactant; and between 0.001% and 1% by weight of a surfactant selected from the group consisting of anionic surfactants, cationic surfactants and amphoteric surfactants.

2. The disposable wipe of claim 1, wherein the fabric is made of a cellulosic material.

3. The disposable wipe of claim 1, wherein the liquid is selected from the group consisting of furniture polishes, hard surface cleaners and insect control agents.

4. The disposable wipe of claim 1, wherein the thickener is a salt of a cross-linked polymer of acrylic acid.

5. The disposable wipe of claim 1, wherein the dispersion, apart from the thickener, comprises at least 2% by weight of polysiloxane.

6. The disposable wipe of claim 5, wherein the dispersion, apart from the thickener, comprises two different polysiloxanes having different viscosities from each other.

7. The disposable wipe of claim 1, further comprising an antimicrobial agent.

8. The disposable wipe of claim 1, wherein the thickener is present in a sufficient amount so as to retard the tendency of the dispersion to migrate along the wipe downward in response to gravity.

9. The disposable wipe of claim 1, wherein the dispersion, apart from the thickener, comprises no more than 1% by weight of surfactant in total.

10. A method of polishing a piece of furniture, comprising:
 obtaining a disposable wipe comprising a fabric that has been impregnated with a liquid polish in the form of a dispersion, the dispersion comprising a biliquid foam having a thickener selected from the group consisting of carbomers, colloidal polymers and gums, the dispersion, apart from the thickener, comprising:
 at least 1% by weight of silicone oil;
 between 0.0001% and 1% by weight of nonionic surfactant;
 between 0.0001% and 1% by weight of a surfactant selected from the group consisting of anionic surfactants, cationic surfactants and amphoteric surfactants; and
 at least 10% by weight of water; and
 rubbing the wipe against the furniture so as to transfer at least a portion of the foam onto the furniture.

* * * * *